United States Patent
Niijima et al.

(10) Patent No.: US 12,205,572 B2
(45) Date of Patent: Jan. 21, 2025

(54) FOOD TEXTURE PRESENTATION DEVICE, FOOD TEXTURE PRESENTATION METHOD AND FOOD TEXTURE PRESENTATION PROGRAM

(71) Applicant: Nippon Telegraph and Telephone Corporation, Tokyo (JP)

(72) Inventors: Arinobu Niijima, Musashino (JP); Toki Takeda, Musashino (JP); Takafumi Mukouchi, Musashino (JP); Takashi Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 170 days.

(21) Appl. No.: 17/912,568

(22) PCT Filed: Apr. 24, 2020

(86) PCT No.: PCT/JP2020/017758
§ 371 (c)(1),
(2) Date: Sep. 19, 2022

(87) PCT Pub. No.: WO2021/214998
PCT Pub. Date: Oct. 28, 2021

(65) Prior Publication Data
US 2023/0143499 A1 May 11, 2023

(51) Int. Cl.
*G10K 15/02* (2006.01)

(52) U.S. Cl.
CPC .................................. *G10K 15/02* (2013.01)

(58) Field of Classification Search
None
See application file for complete search history.

(56) References Cited

U.S. PATENT DOCUMENTS

| | | | | |
|---|---|---|---|---|
| 2013/0263004 A1* | 10/2013 | Kwon | ................... | G06F 3/167 715/727 |
| 2017/0139385 A1 | 5/2017 | Young et al. | | |
| 2020/0341540 A1* | 10/2020 | Jin | ................... | G06F 3/016 |
| 2021/0082391 A1* | 3/2021 | Reiss | ................... | G06F 3/165 |

FOREIGN PATENT DOCUMENTS

| | | | |
|---|---|---|---|
| JP | 2016093476 | | 5/2016 |
| JP | 2016093476 A | * | 5/2016 |
| JP | 2019502218 | | 1/2019 |

OTHER PUBLICATIONS

Minamizawa et al., "TECHTILE toolkit: a prototyping tool for design and education of haptic media," Proceedings of the 2012 Virtual Reality International Conference 2012, Mar. 28, 2012, 2 pages.

* cited by examiner

*Primary Examiner* — Walter F Briney, III
(74) *Attorney, Agent, or Firm* — Fish & Richardson P.C.

(57) ABSTRACT

Disclosed is a food texture presentation apparatus including a synthesizer that acquires, with reference of a recipe of a food product selected, audio signals of mastication sounds of ingredients contained in the food product from a database and synthesizes the acquired audio signals of the ingredients into an audio signal of a food texture to be presented, and a presentation unit that uses the synthesized audio signal to present the food texture of the food product.

12 Claims, 5 Drawing Sheets

FOOD TEXTURE PRESENTATION DEVICE, FOOD TEXTURE PRESENTATION METHOD AND FOOD TEXTURE PRESENTATION PROGRAM

CROSS-REFERENCE TO RELATED APPLICATIONS

This application is a National Stage application under 35 U.S.C. § 371 of International Application No. PCT/JP2020/017758, having an International Filing Date of Apr. 24, 2020.

The disclosure of the prior application is considered part of the disclosure of this application, and is incorporated by reference in its entirety into this application.

TECHNICAL FIELD

The present disclosure relates to a food texture presentation apparatus, a food texture presentation method, and a food texture presentation program.

BACKGROUND ART

A technique for presenting a virtual food texture has been studied as one way to augment an eating experience. NPL 1 describes a haptic device that records haptic senses and plays them back.

CITATION LIST

Non Patent Literature

NPL 1: Minamizawa, Kouta, et al. "TECHTILE toolkit: A prototyping tool for design and education of haptic media." Proceedings of the 2012 Virtual Reality International Conference. 2012

SUMMARY OF THE INVENTION

Technical Problem

When a food texture is presented by using sound and vibration, in order to present the food textures of the various food products, it is conceivable to record mastication sounds of these food products. However, it is difficult to pre-record the mastication sounds of all food products.

While a single ingredient is considered to be replaced with an ingredient having a similar food texture, it is difficult to replace a food texture of a food product (e.g., curry and rice) cooked using a plurality of ingredients with a food texture of another food product. Thus, when the mastication sound of the food product cooked with a plurality of ingredients is not recorded, it is difficult to present the food texture of the food product.

The present disclosure has been made in view of the problems described above, and an object of the present disclosure is to provide a food texture presentation apparatus, a food texture presentation method, and a food texture presentation program, capable of presenting a food texture of a food product whose mastication sound is not recorded.

Means for Solving the Problem

One aspect of the present disclosure is a food texture presentation apparatus including a synthesizer that acquires, with reference of a recipe of a food product selected, audio signals of mastication sounds of ingredients contained in the food product from a database and synthesizes the acquired audio signals of the ingredients into an audio signal of a food texture to be presented, and a presentation unit that uses the synthesized audio signal to present the food texture of the food product.

One aspect of the present disclosure is a food texture presentation method performed by a food texture presentation apparatus, the food texture presentation method including acquiring, with reference of a recipe of a food product selected, audio signals of mastication sounds of ingredients contained in the food product from a database and synthesizing the acquired audio signals of the ingredients into an audio signal of a food texture to be presented, and using the synthesized audio signal to present the food texture of the food product.

An aspect of the present disclosure is a food texture presentation program for causing a computer to operate as the food texture presentation apparatus.

Effects of the Invention

The present disclosure can provide the food texture presentation apparatus, the food texture presentation method, and the food texture presentation program, capable of presenting the food texture of the food product whose mastication sound is not recorded.

DESCRIPTION OF EMBODIMENTS

An embodiment of the present disclosure will be described below with reference to the drawings.

Configuration of Food Texture Presentation Apparatus

Figure 1:
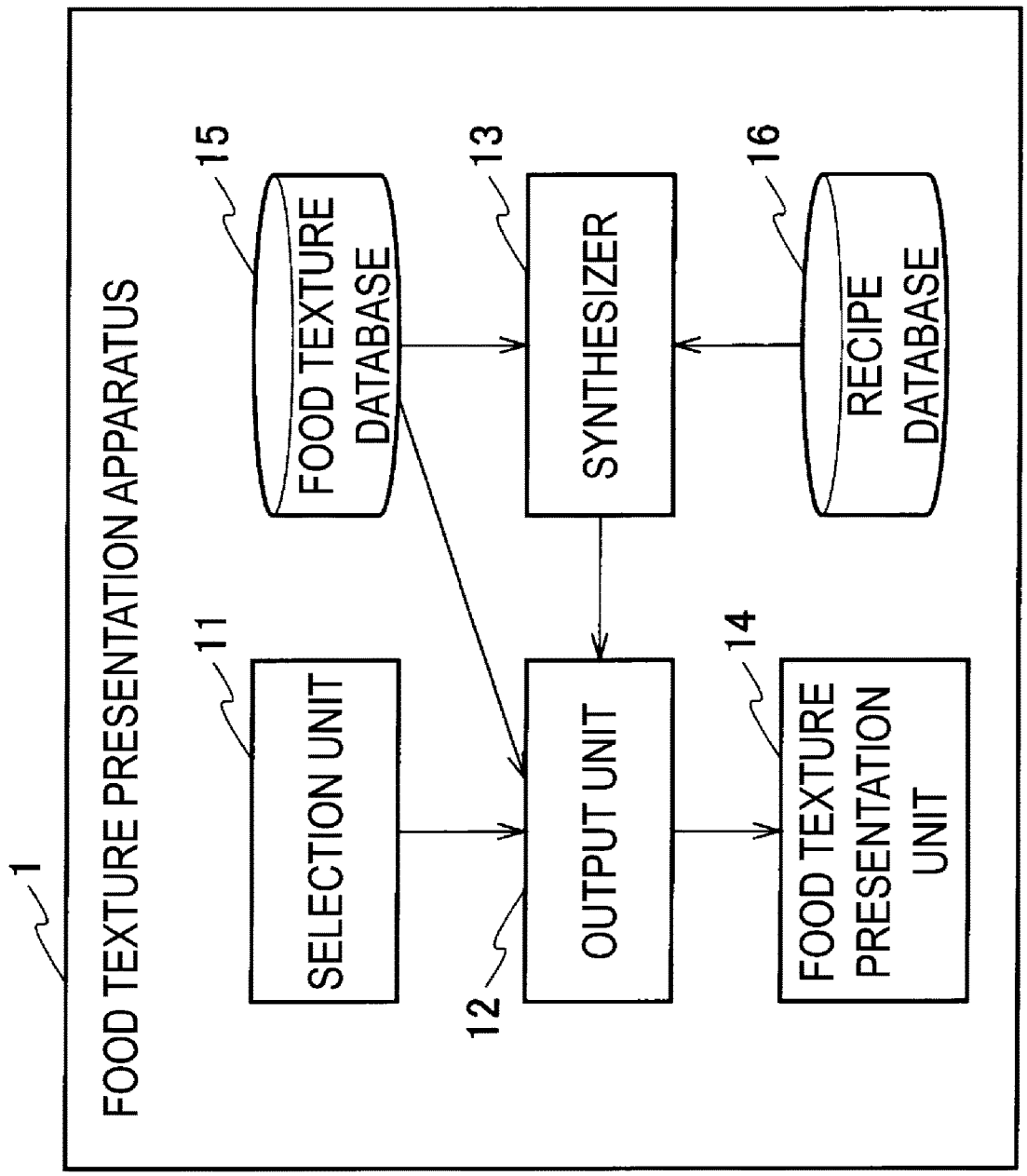
FIG. 1 is a block diagram illustrating a configuration of a food texture presentation apparatus according to an embodiment of the present disclosure.

FIG. 1 is a block diagram illustrating a configuration of a food texture presentation apparatus 1 in an embodiment of the present disclosure. The food texture presentation apparatus 1 of the present embodiment presents a virtual food texture by using sound (auditory stimulation) and vibration (haptic stimulation). The sound and the vibration can be generated from an audio signal of a mastication sound.

The food texture presentation apparatus 1 illustrated includes a selection unit 11, an output unit 12, a synthesizer 13, a food texture presentation unit 14, a food texture database 15, and a recipe database 16.

The selection unit 11 accepts a food product selected by a user. The user selects the food product for which the user wants to present the food texture and inputs the selected food product to the food texture presentation apparatus 1. The food product may include only one ingredient (e.g., apple or tofu) or may be a dish (e.g., curry and rice) cooked using a plurality of ingredients.

The output unit 12 acquires the audio signal of the selected food product from the food texture database 15 and outputs the acquired audio signal to the food texture presentation unit 14. When the audio signal of the selected food is not present in the food texture database 15, the output unit 12 delivers identification information (food product ID, food product name) indicating the selected food product to the synthesizer 13.

The synthesizer 13 acquires, with reference of a recipe of the food product (selected food product) designated from the output unit 12, the audio signals of the mastication sounds of ingredients contained in the food product from the food texture database 15 and synthesizes the acquired audio signals of ingredients into an audio signal of the food texture to be presented. The food texture synthesizer 13 outputs the synthesized audio signal to the output unit 12.

The synthesizer 13 may process each of the audio signals acquired from the food texture database 15 in accordance with a cooking method in the recipe and may synthesize the processed audio signals. Furthermore, the synthesizer 13 may process each audio signal acquired from the food texture database 15 in accordance with an amount of each ingredient in the recipe and may synthesize the processed audio signals.

The synthesizer 13 may select a predetermined number of ingredients among all the ingredients contained in the food product and may acquire only the selected predetermined number of the audio signals from the food texture database 15. For example, it is conceivable that the synthesizer 13 selects, with reference to the recipe, the predetermined number of ingredients in descending order of the amount of the ingredient.

The food texture presentation unit 14 uses the synthesized audio signal to present the food texture of the selected food product. Specifically, the food texture presentation unit 14 uses a signal waveform of the audio signal delivered from the output unit 12 to present the auditory stimulation and the haptic stimulation to the user.

The food texture database 15 stores the audio signals of the mastication sounds of each of the plurality of food products. The mastication sounds of the plurality of food products are pre-recorded with a microphone and stored in the food texture database 15. The recipe database 16 stores recipes of a plurality of food products. The recipe is data that describes a method of cooking the food product (dish). The recipe describes ingredients and the amounts of the ingredients that will be used, cooking methods, cooking procedures, and the like.

Figure 2:
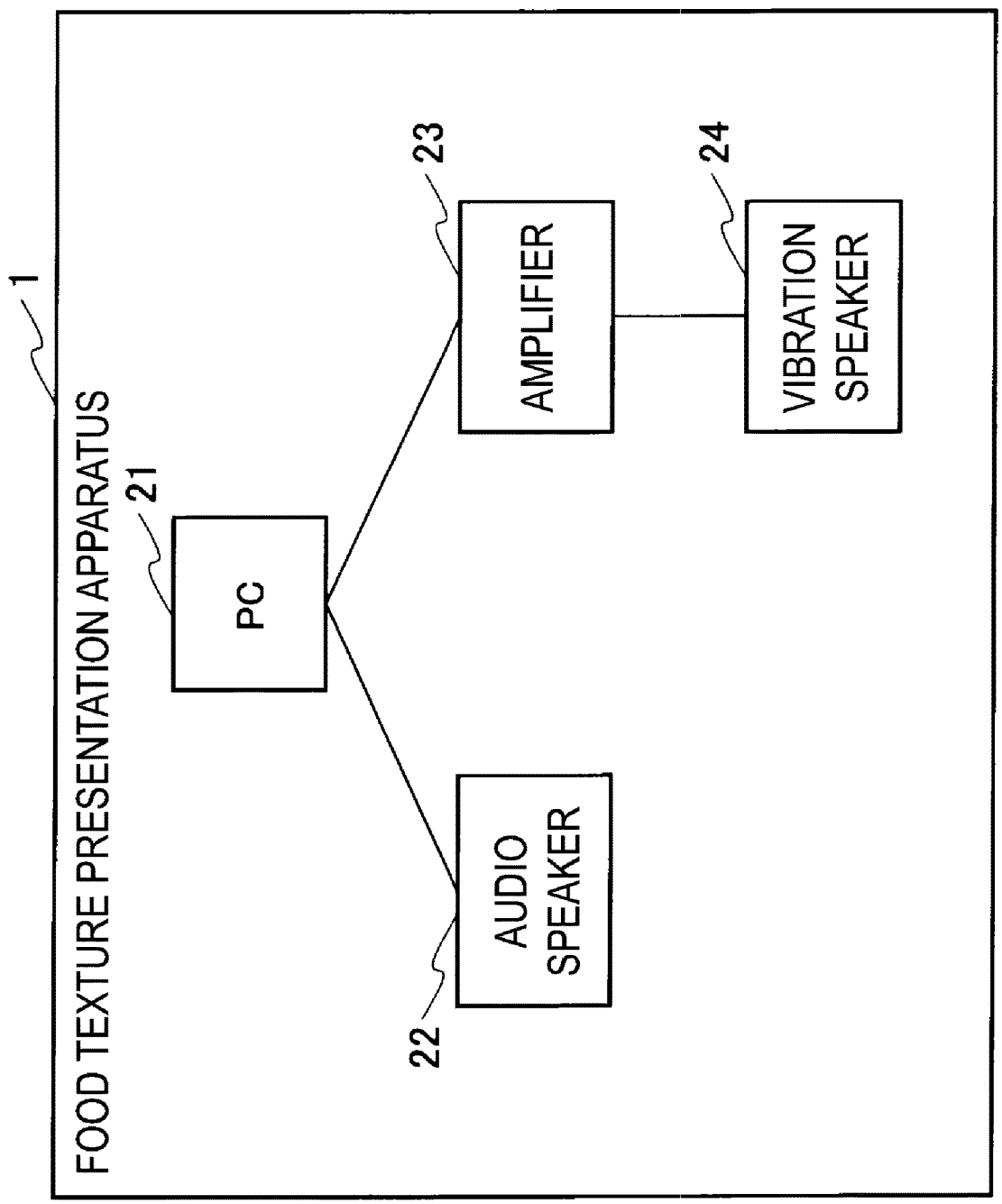
FIG. 2 is a hardware configuration diagram illustrating an implementation example of the food texture presentation apparatus.

FIG. 2 is a hardware configuration diagram illustrating an implementation example of the food texture presentation apparatus 1. The illustrated food texture presentation apparatus 1 includes, as hardware, a PC 21, an audio speaker 22, an amplifier 23, and a vibration speaker 24.

The PC 21 (personal computer) functions as the selection unit 11, the output unit 12, the synthesizer 13, the food texture database 15, and the recipe database 16 illustrated in FIG. 1. The PC 21 outputs, based on user input information, the audio signal of the food product designated in the input information, or the audio signal synthesized from the audio signals of the ingredients of the food product. By using the output audio signal, the audio speaker 22 outputs sound to stimulate the hearing sense, and the vibration speaker 24 (transducer) vibrates the face or the like to stimulate the haptic sense.

The audio speaker 22 functions as the food texture presentation unit 14 (auditory stimulation presentation unit) of FIG. 1. That is, the audio speaker 22 audibly presents the audio signal output from the PC 21 to the user.

The amplifier 23 and the vibration speaker 24 function as the food texture presentation unit 14 (haptic stimulation presentation unit) of FIG. 1. That is, the vibration speaker 24 presents the audio signal output from the PC 21 to the user by vibration. The amplifier 23 amplifies the sound in a low frequency range of approximately 40 to 300 Hz. The vibration speaker 24 presents the amplified audio signal as the food texture by vibration.

As the audio speaker 22, for example, a commercially available audio speaker (wearable speaker) such as a headphone or a neck speaker may be used. When the headphone is used, the audio speaker 22 is worn in the user's ear. When the neck speaker is used, the audio speaker 22 is worn on the user's shoulder.

When the audio speaker 22 is the headphone, the vibration speaker 24 is connected to the headphone and is worn on the user's face (e.g., cheek). When the audio speaker 22 is the neck speaker, the vibration speaker 24 is connected to the neck speaker and is mounted to the user's clavicle or the like.

Specifically, dividers of the audio signal are connected to a headphone terminal of the PC 21, and one of the dividers is coupled to the neck speaker (audio speaker 22), for example. The other divider is connected to the amplifier 23 that amplifies bass, and further an output terminal of the amplifier 23 is connected to the two vibration speakers 24. The two vibration speakers 24 are each fastened under portions of the neck speaker that are placed on both shoulders. That is, the vibration speaker 24 is disposed at a portion of the neck speaker that is in contact with the user's body.

The user uses such a neck speaker integrated with the vibration speaker while wearing over the shoulder, similar to a typical neck speaker. The vibration speaker 24 is abutted against a clavicle portion of the shoulder, so that while sound is heard from the neck speaker, the vibration is transmitted to the clavicle. And then, the vibration is transmitted to the face, so that the user feels the stimulation presented from the neck speaker and the vibration speaker 24 like the food texture.

Operation of Food Texture Presentation Apparatus

Figure 3:
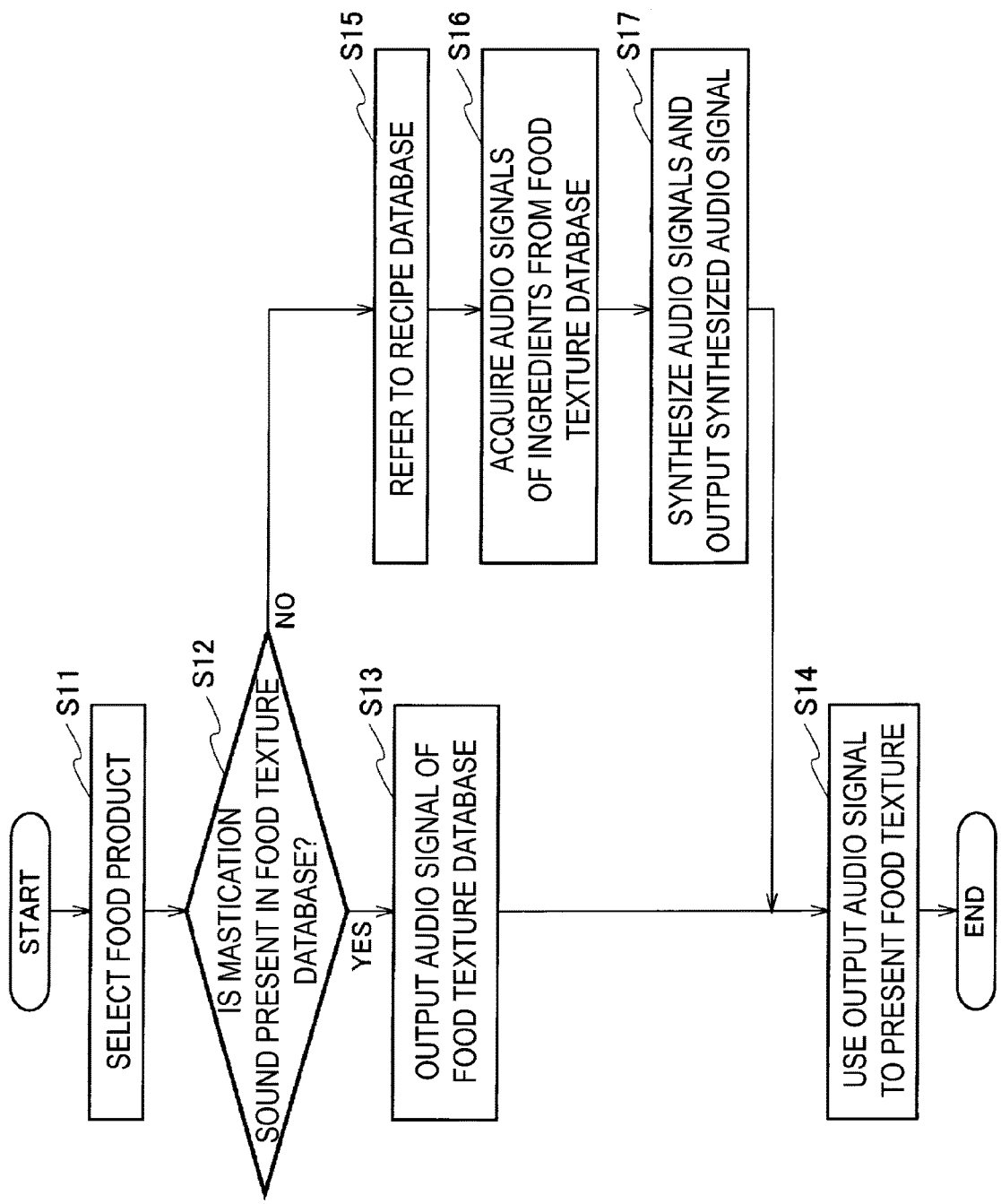
FIG. 3 is a flowchart illustrating an operation of the food texture presentation apparatus.

FIG. 3 is a flowchart illustrating an operation of the food texture presentation apparatus 1 of the present embodiment.

The user selects the food product for which the user wants to present the food texture and inputs the selected food product to the food texture presentation apparatus 1. The selection unit 11 of the food texture presentation apparatus 1 accepts the input food product (S11). When the mastication sound of the input food product is present in the food texture database 15 (S12: YES), the output unit 12 acquires the audio signal of the mastication sound of the food product from the food texture database 15 and outputs the acquired audio signal to the food texture presentation unit 14 (S13).

If the mastication sound of the input food product is not present in the food texture database 15 (S12: NO), the output unit 12 delivers the identification information of the food product to the synthesizer 13. The synthesizer 13 acquires the recipe of the accepted food product from the recipe database 16 (S15). The synthesizer 13 acquires, from the acquired recipe, the audio signal of the mastication sound of each ingredient, which is the material of the food product, from the food texture database 15 (S16). The synthesizer 13 synthesizes the audio signals of respective ingredients and outputs the synthesized audio signal to the output unit 12 (S17). The output unit 12 outputs the audio signal, which is delivered from the synthesizer 13, to the food texture presentation unit 14 as the audio signal of the mastication sound of the selected food product.

The food texture presentation unit 14 uses the audio signal output from the output unit 12 to present the sound (auditory stimulation) and the vibration (haptic stimulation) to the user (S14). In the present embodiment, a combination of the mastication sounds of the ingredients constituting the food product presents the food texture of the food product selected by the user.

For example, when the user has selected a namul (food product), and the audio signal of the namul is present in the food texture database 15, the output unit 12 outputs the audio signal of the namul, which is acquired from the food texture database 15, to the food texture presentation unit 14. On the other hand, when the audio signal of the namul is not present in the food texture database 15, the synthesizer 13 refers to the recipe of the namul from the recipe database 16. The synthesizer 13 acquires, from the recipe data, various items such as materials, cooking methods, and amounts. Then, the synthesizer 13 acquires the audio signals of "bean sprouts", "spinach", and the like, which are the ingredients of the namul described in the recipe, from the food texture database 15 and outputs the audio signal synthesized by superimposing the audio signal of "bean sprouts", the audio signal of "spinach", and the like to the output unit 12.

A method of superimposing the audio signals in S17 is to align starting positions of the audio signals. For example, when the two audio signals (ω1t and ω2t) are superimposed, the two audio signals are added together to synthesize an audio signal (f(t)) as in the following equation.

$$f(t)=\sin(\omega 1 t)+\sin(\omega 2 t)$$

Alternatively, the synthesizer 13 may process each audio signal acquired from the food texture database 15 in accordance with the cooking method in the recipe, and then may synthesize the processed audio signal. The cooking method (type of cooking) includes baking, stewing, boiling, stir-frying, deep-frying, steaming, dressing, and the like. As the audio processing in accordance with the cooking method, for example, in the case of "baking", because the material commonly becomes hard, it is conceivable that the synthesizer 13 emphasizes a high frequency component of the synthesized audio signal. In the case of "stewing", because the material commonly becomes soft, it is conceivable that the synthesizer 13 attenuates the high frequency component of the synthesized audio signal. This is based on the knowledge that the high frequency component contributes to perception of hardness. For the processing of the audio signal in accordance with the cooking method, an algorithm of the processing method may be separately prepared, such as taking into consideration not only the cooking method but also a cooking time.

Furthermore, the synthesizer 13 may process each audio signal acquired from the food texture database 15 in accordance with an amount of each ingredient in the recipe and may synthesize the processed audio signals. For example, the synthesizer 13 adjusts sound pressure (volume of sound) in accordance with the amount of each ingredient. Specifically, the synthesizer 13 increases the sound pressure of a large amount of ingredient and reduces the sound pressure of a low amount of ingredient. In order to adjust the sound pressure, a maximum value of the sound pressure of the audio signal of each ingredient is adjusted by processing such as normalizing or a compressor. This is because it is believed that the larger the amount, the larger the ratio with respect to the overall mastication sound.

Figure 4:
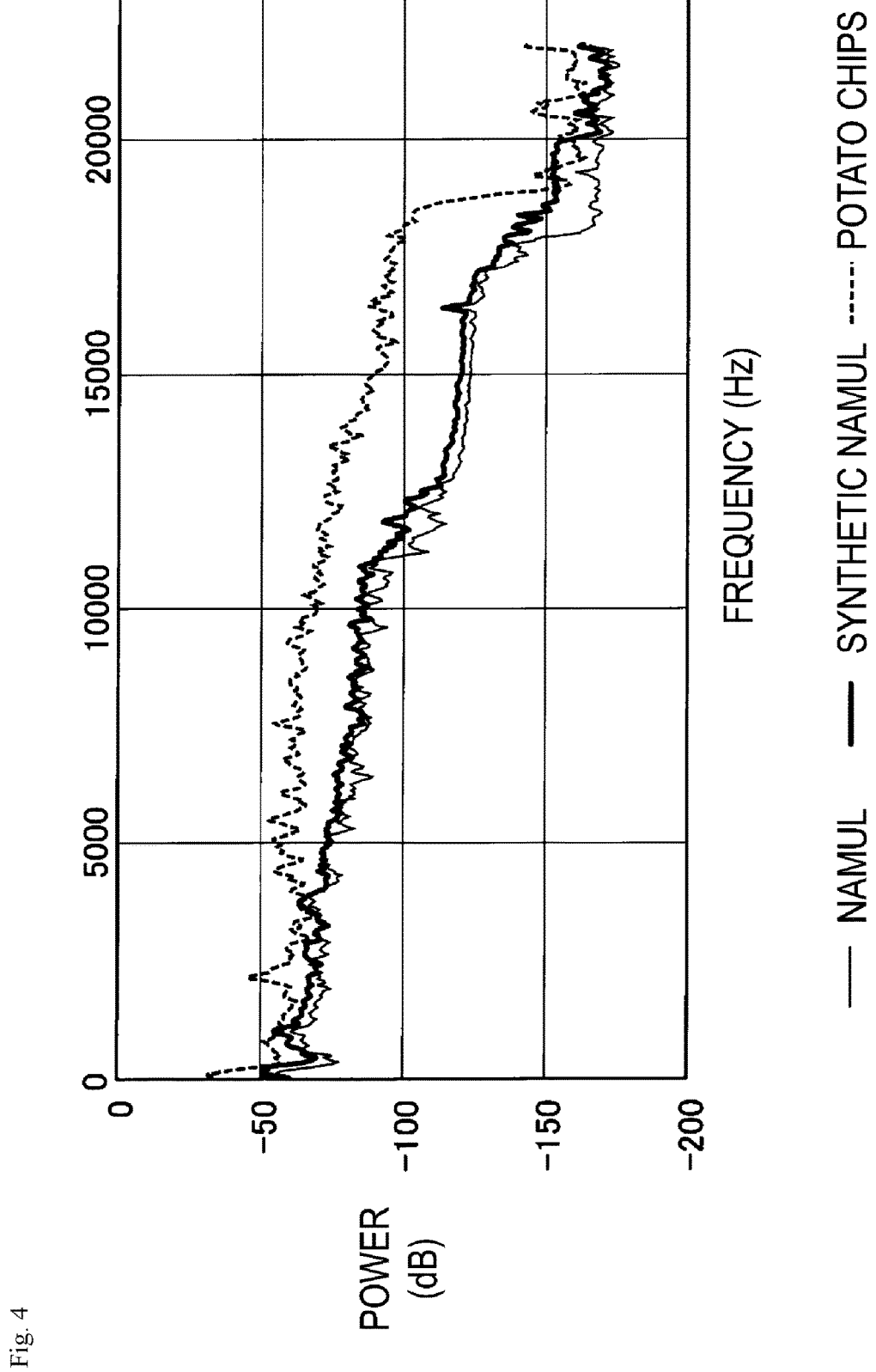
FIG. 4 is a graph illustrating a frequency analysis result of an audio signal.

FIG. 4 is a graph showing results of frequency analysis of an actual mastication sound of namul, a sound obtained by synthesizing mastication sounds of "bean sprouts" and "spinach", which are the ingredients of the namul, and a mastication sound of potato chips. The synthesized sound of namul is similar to the actual sound of namul and exhibits characteristics different from the sound of potato chips. Thus, it can be said that the food texture similar to the food texture (mastication sound) of the cooked food product can be presented by synthesizing the audio signals of each ingredient contained in the food product.

As described above, the food texture presentation apparatus 1 of the present embodiment includes the synthesizer 13 that acquires, with reference of the recipe of the selected food product, the audio signals of the mastication sounds of each ingredient contained in the food product from the food texture database 15 and synthesizes the acquired audio signals of each ingredient into the audio signal of the food texture to be presented, and the food texture presentation unit 14 that uses the synthesized audio signal to present the food texture of the food product.

Thus, in the present embodiment, even in the food product whose mastication sound is not recorded, the food texture of the food product can be presented to the user. Specifically, the audio signal of each ingredient contained in the food product is synthesized, and the auditory stimulation provided by the sound and the haptic stimulation provided by the vibration can be presented to the user by using the synthesized audio signal.

Hardware Configuration

Figure 5:
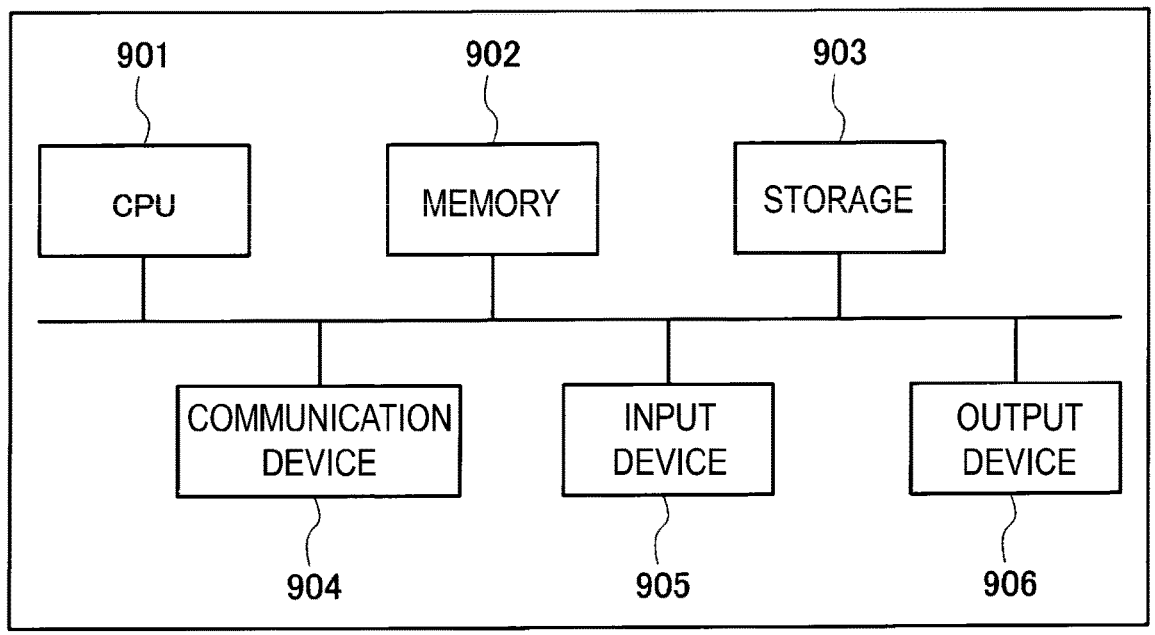
FIG. 5 is a hardware configuration example.

As the food texture presentation apparatus 1 described above, for example, a general-purpose computer system as illustrated in FIG. 5 can be used. The illustrated computer system includes a central processing unit (CPU, processor) 901, a memory 902, a storage 903 (hard disk drive: HDD or solid state drive: SSD), a communication device 904, an input device 905, and an output device 906. The memory 902 and the storage 903 are storage devices. In the computer system, the CPU 901 executes a predetermined program loaded in the memory 902 to achieve each function of the food texture presentation apparatus 1.

The food texture presentation apparatus 1 may be implemented on one computer or may be implemented on a plurality of computers. Furthermore, the food texture presentation apparatus 1 may be a virtual machine implemented on a computer.

The program for the food texture presentation apparatus 1 may be stored in a computer-readable recording medium such as a HDD, a SSD, a universal serial bus (USB) memory, a compact disc (CD), or a digital versatile disc (DVD) or may be distributed via a network.

The present disclosure is not limited to the embodiment described above, and various modifications and combinations can be made within the scope of the gist of the present disclosure.

REFERENCE SIGNS LIST

1: Food texture presentation apparatus
11: Selection unit
12: Output unit
13: Synthesizer
14 Food texture presentation unit
15: Food texture database
16: Recipe database
21: PC
22: Audio speaker
23: Amplifier
24: Vibration speaker

The invention claimed is:

1. A food texture presentation apparatus comprising:
a synthesizer configured to:
    select a predetermined number of ingredients among all ingredients contained in a food product based on an amount of each ingredient, wherein the predetermined number of ingredients are selected in a descending order of the amount of each ingredient;
    acquire audio signals of mastication sounds of the selected predetermined number of ingredients from a database; and
    synthesize the audio signals of the selected predetermined number of ingredients into an audio signal of a food texture to be presented; and
a presentation interface configured to use the synthesized audio signal to present the food texture of the food product.

2. The food texture presentation apparatus according to claim 1, wherein the presentation interface includes an audio speaker and a vibration speaker, and
    the audio speaker presents the synthesized audio signal by a sound, and
    the vibration speaker presents the synthesized audio signal by a vibration.

3. The food texture presentation apparatus according to claim 1, wherein the synthesizer is configured to process audio signals acquired from the database in accordance with a cooking method in a recipe and synthesize the processed audio signals, wherein the synthesizer is configured to adjust a frequency component based on a degree of hardness of the food product cooked using the cooking method.

4. The food texture presentation apparatus according to claim 1, to synthesize the audio signals of the selected predetermined number of ingredients, the synthesizer is configured to superimpose the audio signals of the selected predetermined number of ingredients.

5. The food texture presentation apparatus according to claim 4, to superimpose the audio signals of the selected predetermined number of ingredients, the synthesizer is configured to align starting positions of the audio signals of the selected predetermined number of ingredients.

6. The food texture presentation apparatus according to claim 1, wherein the synthesizer is configured to:
    adjust a sound pressure of an audio signal of each ingredient based on the amount of each ingredient by normalizing or a compressor.

7. A food texture presentation method performed by a food texture presentation apparatus, the food texture presentation method comprising:
    selecting a predetermined number of ingredients among all ingredients contained in a food product based on an amount of each ingredient, wherein the predetermined number of ingredients are selected in a descending order of the amount of each ingredient;
    acquiring audio signals of mastication sounds of the selected predetermined number of ingredients from a database;
    synthesizing the audio signals of the selected predetermined number of ingredients into an audio signal of a food texture to be presented;
    using the synthesized audio signal to present the food texture of the food product.

8. The food texture presentation method according to claim 7, wherein using the synthesized audio signal to present the food texture of the food product comprises:
    using an audio speaker to present the synthesized audio signal by a sound, and
    using a vibration speaker to present the synthesized audio signal by a vibration.

9. The food texture presentation method according to claim 7, comprising:
    processing audio signals acquired from the database in accordance with a cooking method and cooking time in a recipe and synthesizing the processed audio signals.

10. A non-transitory computer readable medium storing one or more instructions causing a computer to operate as a food texture presentation apparatus to execute:
    selecting a predetermined number of ingredients among all ingredients contained in a food product based on an amount of each ingredient, wherein the predetermined number of ingredients are selected in a descending order of the amount of each ingredient;
    acquiring audio signals of mastication sounds of the selected predetermined number of ingredients from a database;
    synthesizing the acquired audio signals of the ingredients into an audio signal of a food texture to be presented;
    using the synthesized audio signal to present the food texture of the food product.

11. The non-transitory computer readable medium according to claim 10, wherein using the synthesized audio signal to present the food texture of the food product comprises:
    using an audio speaker to present the synthesized audio signal by a sound, and
    using a vibration speaker to present the synthesized audio signal by a vibration.

12. The non-transitory computer readable medium according to claim 10, wherein the one or more instructions cause the computer to execute:
    processing audio signals acquired from the database in accordance with a cooking method in a recipe and synthesizing the processed audio signals.

* * * * *